April 17, 1962      J. R. NELSON      3,029,467
METHOD AND APPARATUS FOR FORMING HOLLOW PLASTIC ARTICLES
Filed Oct. 6, 1958      2 Sheets-Sheet 1
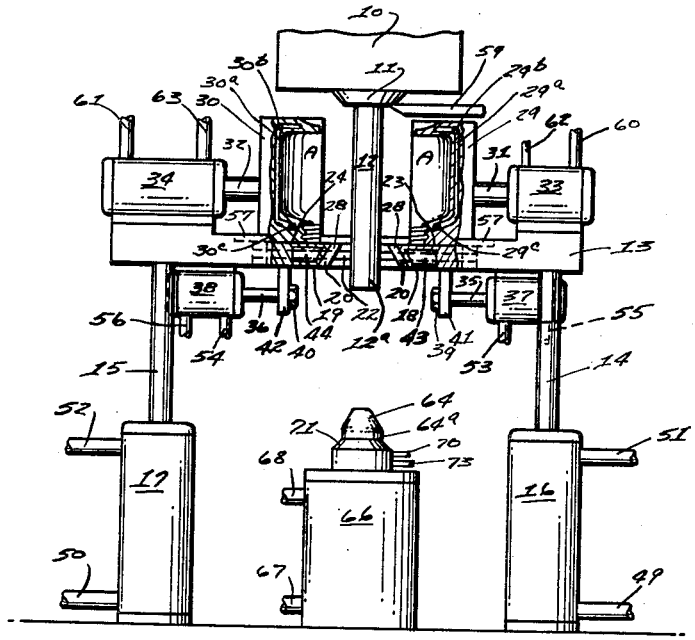
Fig. 1.
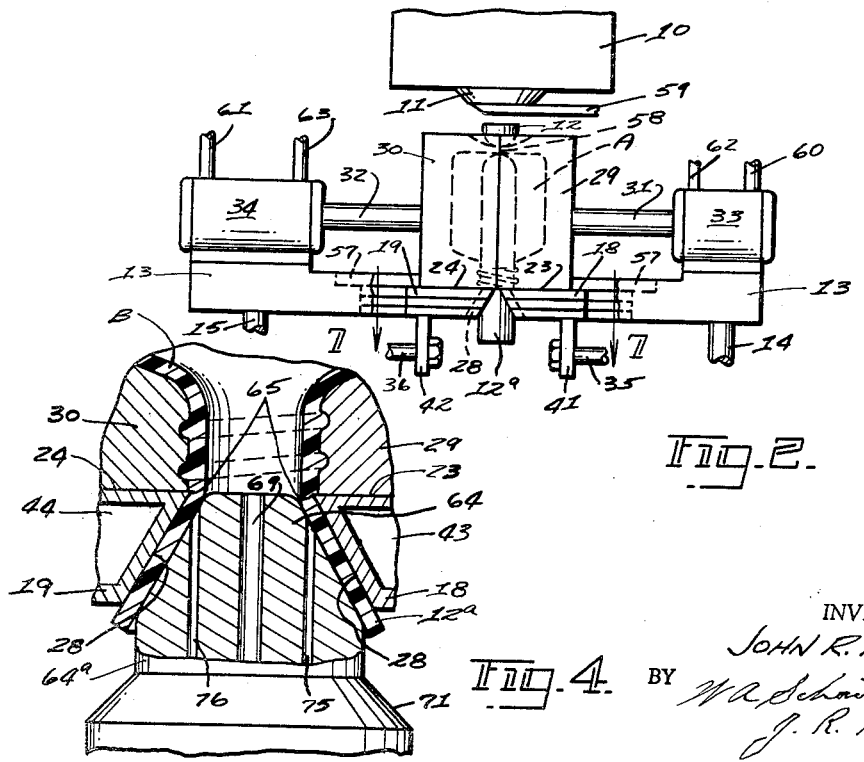
Fig. 2.
Fig. 4.
INVENTOR.
JOHN R. NELSON
BY
ATTORNEYS April 17, 1962     J. R. NELSON     3,029,467
METHOD AND APPARATUS FOR FORMING HOLLOW PLASTIC ARTICLES
Filed Oct. 6, 1958     2 Sheets-Sheet 2
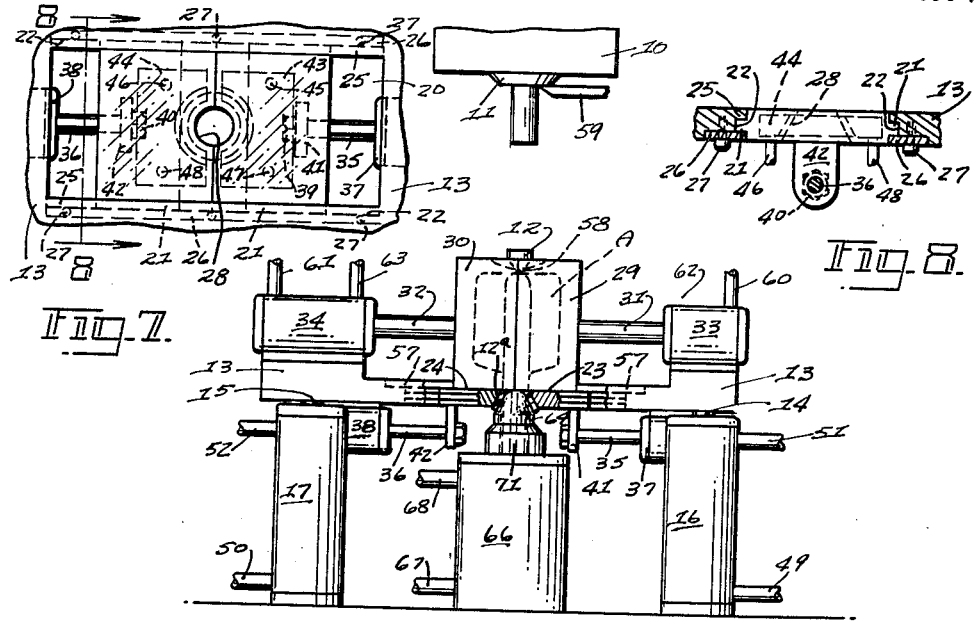
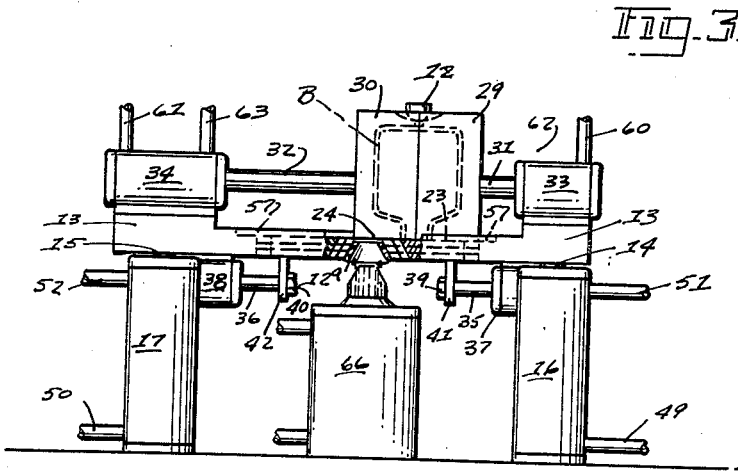
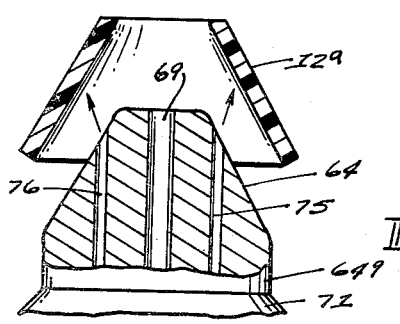
INVENTOR.
JOHN R. NELSON
BY
ATTORNEYS United States Patent Office 3,029,467
Patented Apr. 17, 1962

3,029,467
METHOD AND APPARATUS FOR FORMING HOLLOW PLASTIC ARTICLES
John R. Nelson, Toledo, Ohio, assignor to Owens-Illinois Glass Company, a corporation of Ohio
Filed Oct. 6, 1958, Ser. No. 765,494
4 Claims. (Cl. 18—5)

This invention relates to improved method and apparatus for manufacture of hollow plastic articles, such as bottles and the like, having an external opening, from extruded lengths of hollow tubular formation of a thermoplastic material, and more particularly to manufacture of finished blown articles by expanding such tubular formation while in heated and expandable condition within the confines of a shaping mold.

In known similar processes for making hollow articles, a trimming process has been required to trim one or both ends of the blown article after it has been blown and removed from the final mold.

Furthermore, in prior processes, such as in U.S. Patent No. 2,810,934 to Bailey, the tubing is extruded about a mandrel which receives and guides the tube during extrusion to positively position it for enclosing it in the final mold and, coincidentally with the mold closing operation, assists in compression molding a neck finish or end portion on the article formed, i.e. a plastic bottle. The mandrel tends to influence and alter the characteristics of the plastic, such as by a chilling influence internally. This will adversely effect wall distribution of the plastic when blown to the finished article.

In extruders of the continuously operating type, the freely pendent tube of hot and workable plastic is not assured a straight line extrusion, such as might be expected during extrusion of a more rigid material like a metal (aluminum, for example). In other prior art devices which do not employ a mandrel, no provision is made for positioning or aligning the extruded tubing should the extrusion be off axial alignment beyond the orifice. But, in the type process which provides for positioning and aligning the tubing, any deviation in alignment of the extrusion has been compensated for by receiving the free open end on a mandrel or peg that is considerably undersized of the tube. Also, this mandrel or peg has, generally speaking, defined the interior bore of the opening of the blown article, hence, the extruding tubing is considerably oversized at its internal diameter to make the mandrel or peg-type process operable. This necessitates in forming plastic bottles, for instance, compressing the size of the tube to that substantially of the mandrel, which results in excess flash or "ears" being formed outwardly at the mold seam for the neck and must be trimmed after removal from the mold. This characteristic flash (excess plastic) is illustrated in U.S. Patent No. 2,787,023 to Hagen et al.

The present invention has, for one of its objects, the provision of method and apparatus that will eliminate the necessity of extrusion of a tube considerably oversized of the final neck opening or opening of the article and allow formation of articles without this excess plastic attached at the mold seam near the opening or the neck of the blown article; yet will assure axial alignment of the extruded tubing for blow forming an article from a length thereof.

It is another one of the important objects of the present invention to provide improved method and apparatus wherein the mandrel is eliminated and the extruded plastic tubing is aligned and held in position for working on the tube by capturing the free unconfined end thereof in a variable size aperture just prior to closing the blowing mold about a length of the tube.

Another object of the invention resides in the fact that the free end of the tube is utilized to supply excess plastic for holding the tube in proper alignment for closing a mold about it and this excess plastic trimmed from the formed article by severing at the juncture between the mold and the tube holding member so that the opening of the formed article is trimmed and finished.

Another important object of the invention is the provision of an annular score line on the tubing at the plane where the excess plastic is trimmed from the formed article.

Still another object of the invention is the provision of improved method and novel apparatus for use with a machine for blowing plastic articles from extruded tubing which will, through opening and closing movement of tube holding members, capture and assure alignment of the unconfined free end of the extruding tubing and thereafter hold that end of the tubing for pressing an annular score in the tube defining the trimming line, and trim the excess plastic at said trimming line while the formed article is still held in the mold.

Still further objects and advantages of the invention will become apparent from the following detailed description of the accompanying drawings on which, by way of preferred example, is presented one form of the invention to explain its principles and practical adaptation.

On the drawings:

FIG. 1 is a front elevational view, partly in section, of one form of machine for carrying out the method of the invention and includes the novel improvement apparatus thereof. The machine, as here represented, illustrates the initial part of the process at which the partible tube holding members receive the tubing in open position.

FIG. 2 is a fragmentary view of the machine of FIG. 1, and illustrates an advanced stage of the method of the invention after an axial end portion of the tube is captured and the pendent tube aligned by closing the tube holding members, the partible blow mold halves are closed about an extruded length of the tube, and the tube is severed from the extruder.

FIG. 3 is a view similar to FIG. 1, but showing the mold enclosed length of tubing and the captured open end portion of the tubing below the mold moved to a remote position relative to the extruder orifice to seat the captured open end portion over a blow head to press a scored trimming line on the tube and then blow the mold enclosed tube to shape.

FIG. 4 is an enlarged fragmentary view, partly in section, illustrating the relationship of the closed mold, the closed tube holding members, and the seated blow head in detail after the trimming score line is pressed and the mold enclosed tube is blown to shape.

FIG. 5 is a view similar to FIG. 3, but illustrating the step of the method for severing the excess plastic of the captured portion of the tube from the blown article in the mold by lateral relative movement between the closed partible molds and the closed tube holding members.

FIG. 6 is an enlarged fragmentary view, illustrating the ejection of the trimmed piece of excess plastic from the blow head.

FIG. 7 is a plan view taken along line 7—7 of FIG. 2, showing the details of the movable tube holding members.

FIG. 8 is a sectional end view, taken along line 8—8 of FIG. 7.

In the present invention a desired blown plastic article is produced by the hereinafter outlined sequence of operations.

Any conventional plastic extruder may be utilized having a downwardly directed annular orifice capable of issuing a freely pendent hollow tubular formation of plastic material from that orifice at a temperature permitting subsequent working of the issued tubular formation as by expansion and setting in a mold. Preferably, the issuing end of the tubular formation is open. After a sufficient length of tubing has been issued from the annular orifice, a limited axial end portion of the issued tubing is freely received within a variable aperture. This aperture is initially expanded to be considerably oversize of the tubing size (diameter). The aperture is next closed about the tubing by contracting the aperture to a size that is the same as or slightly less than the tubing, thereby capturing this axial portion of the tube and firmly restraining it against movement in a lateral direction in order to position and align the issued tubing for closing the sections of a partible mold around a length of the issued tubing. Preferably, the restraint mentioned may be imposed by having a pair of split holding members which are movable toward and away from each other. A semi-circular opening is provided in each member along its seam or margin so that when the two holding members are moved toward each other into a closed abutting relationship (closed position), these openings will coincide side-by-side to define the closed aperture having the same diameter or a slightly lesser diameter than the extruded tubing. These holding members are operated in a plane that is adjacent the opening in the partible mold and preferably carried with a mold bed which is a rigid member on which the partible mold sections are slidably mounted for movement toward and away from each other. This mold bed together with its attachments is capable of movement toward and away from the orifice. The partible mold sections are next closed about the issued length of tubing, and, in the case of the formation of a plastic container having a neck opening, the cavity of the partible mold sections defined therein after they are closed conforms to the container in an inverted position such that the bottom face of the closed particle mold lies in the same plane as the desired end facing of the neck of the container. The bottom end faces of the partible mold sections, when closed, are also contiguous to the top surface of the aperture of the holding members when the latter are closed. The top portions of the partible mold sections are so shaped as to effect a pinching and sealing of the plastic tubing when shifted to their closed position about the tubing.

Subsequent to restraining the free end of the tubing in the closed aperture, the tubing is severed at a point intermediate the top face of the partible mold sections and the orifice of the extruder.

Generally, the mold sections are closed on the tubing at a timer relationship which is substantially coincident with severing and thereby prepares the portion of the tube it encloses for blowing by effecting the aforementioned pinching and sealing of the tubing. However, it should be pointed out that just at the time the tubing is severed, it is only functionally necessary that the mold sections support the tubing. They need, therefore, only be closed sufficiently for that purpose. They need be completely closed so as to pinch and seal one end of the tubing just prior to blowing.

With reference to the severing operation, if desired it can be accomplished by knife-like elements incorporated in the top seam edges of the partible mold sections which could be made to wipe across the extruder orifice. In such case, it is essential that the closed partible mold sections be moved downwardly away from the extruder orifice concurrently with, or immediately following, the severing operation. Alternatively, and as is chosen for the illustration in the drawings, the severing may be accomplished by a separate knife or shear element. In this latter-mentioned severing procedure, the mold sections need be completely closed only prior to blowing a length of the tubing in the mold. With either severing procedure, concurrently with or immediately following the severing step, the mold sections holding the severed length of tubing should be moved axially away from the annular extruder orifice at a rate that exceeds the advancing rate of the oncoming tubing issuing from the extruder orifice. In this manner, the extruder may be operated continuously which will achieve obvious economies in production efficiency and improve the quality and uniformity of the extrusion of the tubing.

Thus, the closed partible mold and mold bed are moved downwardly to a position which will hereinafter be referred to as the "blow position." Concurrently with such downward movement, or immediately after completion of such movement, a blow head or blowing tool is shifted upwardly into the closed aperture defined by the closed holding members and carried with the mold bed. The blow head is thus brought into contact through insertion into the free open end of the axial portion of the tubing held within the closed aperture, and in so doing performs two functions, namely: (1) presses an annular score in the held plastic tubing in the plane of the outer face of the neck of the container by pressing it against a sharp adjacent and internal lip of the closed aperture, and (2) the blow head is seated in the plastic tubing portion held in the aperture to perfect an internal seal between it and the tubing for blowing the tubing to expand it to the shape of the confines of the mold. The blow head or blowing tool is preferably a tapered mold member best described as being substantially conically shaped. The aperture extending outwardly of the aforementioned internal lip or edge is shaped correspondingly as a conical female member. When the two conical shapes, male and female members, are fitted together, there is a sufficient spacing between the side walls of each to accommodate the plastic tubing held by the closed aperture (female aperture) and form the mentioned annular score. After the aforementioned seal is perfected between the captured tubing and the blow head, sufficient fluid under pressure is applied to the interior of the severed length of tubing to effect its expansion to conform to the walls of the closed partible mold. This blowing will also effect a further accentuation of the annular score line or trimming line for the outer face of the neck of the bottle, as mentioned above.

It will be noted from the foregoing that the entire plastic article is formed by blowing, and more important, all portions of the plastic tubing which make up the formed article are expanded by blowing and thus have not been subjected to any extraneous chilling influences or contacts prior to being expanded into contact with the walls of the closed partible mold. The only portion of the tubing which has been subjected to a chilling contact is that limited axial end portion which was first chilled when the severing was performed to cut off the previous length of tubing, and then subsequently this axial end portion is chilled upon entering and being in engagement by the closed aperture in the mold bed. However, this axial end portion, since it is trimmed in the forming operation, does not form any part of the finished plastic article. The cut at the opposite end of the severed length of tubing is also trimmed above the pinch or seal made by closing the mold.

During the last portion of the aforementioned blowing step, or immediately subsequent to its completion, that portion of the initial tubing length (heretofore referred to as the limited axial end portion), which projects downwardly from the closed partible mold sections is then completely severed at the pressed score line, above-mentioned, by a cutting action exerted in the plane of the bottom face of the closed partible mold or, since such bottom faces are in abutting contact with the near top face of the closed holding members in the mold bed, the cutting action is also effected in the top plane of the aperture. This severing action is supplied by moving the mold enclosed article bodily together with the mold at right angles with the sharp internal lip at the top plane of the aperture and in a direction in the plane of the top surface of the aperture. During this movement, it is preferred to maintain the mentioned blowing pressure of fluid through the blow head to assure that the formed article is held tightly in the mold. The severing of the surplus material depending from the bottom end of the closed partible mold is accomplished while the partible mold sections are closed and, hence, while the formed plastic article is completely confined and supported by the closed partible mold.

The mold sections are then opened, and the formed article is ejected from the mold sections in any convenient manner, such as by a laterally directed air blast, and the molds are shifted to their initial open position concentric about the extruder orifice. Concurrently, the aperture is opened by the separation of the holding members so as to leave the formation of trimmed excess plastic on the tapered blow head. This excess formation is then either stripped from the blow head by withdrawing it within its housing or this formation may be blown free of the blow head by application of fluid axially therethrough. In either event the blow head is then cleared for the next cycle. Upon return of the mold bed and the partible mold sections to their initial positions with respect to the extruder orifice, the forming process is then repeated, remembering that in the meantime, the extruder has produced another length of tubing suitable for formation of the next desired plastic article, and upon returning the mold bed and associated parts to the initial position, the free end of the tubing immediately enters the open aperture which is immediately thereafter closed. This aligns the position of that pendent length of tubing for the next molding cycle to begin and without any unnecessary time loss between cycles.

Thus, it may be seen that from the disclosed tube centering and positioning station of the process, any occurrence of non-uniform extruder operation such as to extrude the length of tubing off-center of the axis of the orifice will not foul itself on closing of the molding equipment or interfere with the production of good commercially acceptable bottles. Thus, the process can be made to operate by this alignment feature of the tubing more satisfactorily than with the use of a mandrel for centering and forming the tube but without the presence of the undesirable influences on the tubing always present with mandrel-type operation. Furthermore, it should be obvious that the excessive flash about the opening along the seams of the blowing mold is eliminated which thus eliminates the extraneous trimming operation so that the cycle of the machine can be made to operate fully automatic for producing blown articles.

Referring now to the drawings, a novel form of the apparatus capable of carrying out the just-described process will be described.

In FIG. 1, and likewise on other figures, an extruder 10 has a downwardly directed orifice 11 capable of issuing therethrough a hollow tubular formation of any suitable organic plastic material in heated condition and capable of expansion and then setting to shape upon cooling. There is a wide range of such materials presently offered on the commercial market, for example, commercial grades of polyethylene. The extruder may be of any well-known type capable of continuous operation in which a pressure screw performs the operation of plasticizing the organic plastic material by the application of heat and pressure. The thus heated plasticized material is continuously extruded in a hollow tubular form 12.

The molding apparatus comprises a mold bed 13 which is mounted on piston rods 14 and 15 of fluid pressure actuated vertically reciprocable motors 16 and 17, respectively, operable for vertical movement toward and away from the extruder orifice 11. The central portion of the mold bed 13 is provided with a pair of tube holding members 18 and 19 slidably mounted in horizontal ways in the mold bed for movement toward and away from each other between open and closed positions. For example, the tube holding members 18 and 19 are shown shiftably mounted in a central opening 20 of mold bed 13 (FIG. 7) and are held at the side margins thereof by projecting side tongues 21 integral on opposite sides of said end members 18 and 19 fitted and in corresponding grooves 22 (FIG. 8). The top surface of members 18 and 19 are carried in sliding engagement with the bottom surfaces 23 and 24 of the mold sections (FIGS. 1, 2, 3 and 5). These grooves 22 are machined integral with the mold bed 13 and disposed between an upper flange 25 lying along the side margins of the opening 20 and a lower flange plate 26 fastened to the under side of mold bed 13 along the side margins of the opening 20 at cap screws 27. Thus, the tube holding members may be disassembled and interchanged by use of the cap screws 27 (FIGS. 7 and 8). This readily accommodates set-up of the machine from one tube size to another by changing tube holding members. The tube holding members 18 and 19 define a variable size orifice aperture 28 therebetween and the aperture 28 is axially aligned under the orifice 11 and concentric about the tube 12 which issues from the orifice 11. Mold bed 13 comprises a horizontal plate-like element.

A pair of partible mold sections 29 and 30 are mounted on piston rods 31 and 32, respectively, of the horizontally reciprocating fluid pressure actuated motors 33 and 34. The motors 33 and 34 are rigidly connected near the side margins of the mold bed 13 and are operable to actuate the partible mold sections 29 and 30 toward and away from each other concentrically about the extruded tube 12 between open and closed positions of the mold. These mold sections 29 and 30, when closed, define a molding cavity A (FIG. 2) corresponding to the configuration of the desired plastic article. The lower faces or surfaces 23 and 24 of the two mold sections 29 and 30 are in abutting relationship at the top side of the movable tube holding members 18 and 19. These movable tube holding members 18 and 19 are detachably connected to the piston rods 35 and 36 of fluid pressure actuated reciprocating motors 37 and 38 at their nut connections 39 and 40 on the threaded outer ends of piston rods 35 and 36, respectively, which are inserted through aligned bores in downwardly depending brackets 41 and 42. These brackets are rigidly connected at the underside of their respective tube holding members 18 and 19. These motors 37 and 38 control the lateral movements of the tube holding members for effecting the opening and closing movements of the latter and thereby effect varying the size of the aperture 28 between open and closed positions. As shown on FIG. 1, the two motors 37 and 38 are retracted so that the tube holding members 18 and 19 are in their open positions and the aperture 28 is opened to its largest size. This size is larger than the size of the tube 12, and thereby permits the free entry of the tube 12 as it is directed from the extruder orifice 11 into the aperture 28 when the mold bed 13 is positioned in its uppermost position, hereafter called the "loading position" by the extension of the piston rods 14 and 15. In the arrangement shown on the drawings, the cavity A of the closed mold sections 29 and 30 defines a bottle configuration which is in inverted relationship so that the end or outermost face of the neck of the bottle will be disposed in the same plane as the bottom surfaces 23 and 24 of these mold sections.

As seen in FIG. 1, the mold sections 29 and 30 each have internal coolant chambers 29a and 30a which are adapted to receive a coolant fluid, such as cool water, at inlet connections 29b and 30b and circulate the coolant along the walls of cavity A to remove heat from the blown plastic after tube 12 is blown against those walls. The coolant is exhausted at outlet connections 29c and 30c. This technique of cooling the molds is generally a known expedient for accelerating the setting of the blown plastic article in the mold to thereby increase the speed at which the forming cycle may be successively repeated. This is not, however, a critical feature to performing the molding cycle. It could be carried out without coolant, but not continuously at high production rates.

For the just-mentioned reasons for assisting in high production rates, the tube holding members 18 and 19 are similarly provided with internal coolant chambers 43 and 44 (see FIGS. 1, 4, 7 and 8). Coolant is introduced to these chambers 43 and 44, respectively, through flexible hoses (not shown) connected at inlet ports 45 and 46. These inlet ports 45 and 46 communicate with chambers 43 and 44, respectively (FIG. 7). Coolant fluid circulates through the chambers 43 and 44 which extend parallel along the tapered wall of the aperture 28 (see FIG. 4) and exits from chambers 43 and 44 through outlet ports 47 and 48 and the coolant through flexible hoses (not shown) connected to the outlet ports. As will be apparent from the description of the process, this cooling will assist in chilling the plastic in the axial end portion 12a of the tube 12 and prevent this formation of the excess plastic (shown severed from the formed article in FIGS. 5 and 6, as will be hereinafter described in detail) from sticking on the tapered blowing tool.

When it is desired to initiate the cycle for forming a container, as illustrated on the drawings, fluid under pressure is supplied to the lower ports 49 and 50 of the motors 16 and 17 so as to move the mold bed 13 upwards toward the orifice 11 to the "loading position," as shown in FIG. 1. During this actuation, fluid is exhausted through ports 51 and 52, respectively, of the said motors 16 and 17. Prior to this upward movement of the mold bed 13, the fluid motors 37 and 38 have set the tube holding members 18 and 19 in their "open" position by the application of fluid under pressure at their ports 53 and 54 and fluid therein is exhausted from the motors at ports 55 and 56. Also, before this upward movement of the mold bed 13 takes place, the fluid motors 33 and 34 are connected to receive actuating fluid so that they move the mold sections 29 and 30 to their "open" position. The settings for these two motors 33 and 34 to effect the setting of the mold sections 29 and 30 in their "open" position will be more particularly described hereinafter.

These mold sections are laterally shiftable with respect to the mold bed 13, and may, if desired, be directly mounted on mold bed 13 for horizontal sliding movement with respect thereto. For example, each mold section 29 and 30 may slide in a depression or groove 57 defining horizontally the travel of these sections at the top surface of mold bed 13 to guide the lateral movements of the mold sections with respect to the mold bed. Alternatively, horizontal guide rods over which the mold sections could be mounted to slide may be utilized to guide them in this horizontal movement.

With the mold bed in the loading position (FIG. 1), the holding members 18 and 19 and the mold sections 29 and 30 are each "open." A lower axial end portion 12a of tubing 12 will enter between the open holding members and the mold sections. The motors 33 and 34 are then actuated by connecting pressurized fluid to their ports 55 and 56 and exhausting fluid from their ports 53 and 54 to close the holding members 18 and 19 so that the aperture 28 closes firmly on tubing portion 12a (FIG. 2). If, during the extrusion of tubing 12, the alignment of this freely dependent tubing 12 deviates from the axis of orifice 11, the closing of the aperture 28 will align the tubing 12 so that it is along the axis of the orifice 11 and concentric with respect to the open mold sections.

In the bottle configuration illustrated by mold cavity A (FIG. 2), the mold sections 29 and 30 define the mold cavity A in inverted relationship so that the end face of the neck of the desired bottle will be disposed in the same plane as the bottom surfaces 23 and 24 of the mold sections 29 and 30. Thus, the mold sections 29 and 30 are closed about the length of tubing 12 that is above the top surface of the closed holding members 18 and 19.

In closing the mold sections, their bottom faces 23 and 24 are disposed in a tight contiguous engagement with this top surface of the holding members.

In closing of the mold sections 29 and 30, illustrated in FIG. 2, the top edges of such mold sections achieve a pinching and sealing action at the top end of the length of the tubing 12 enclosed in such mold, such as indicated at 58. While not essential, it is desirable that the neck opening of the molding cavity A exceed the diameter of the plastic tubing 12. In this manner, no axial flash will be produced along the neck finish of the formed bottle by the closing action of the mold sections.

Concurrently with the closing of the mold sections 29 and 30 or immediately thereafter, the tubing 12 is severed from the plastic connected with the extruder (FIG. 2). As illustrated in the drawings, such severing may be accomplished by a laterally shiftable knife-element 59 which is immediately below the extruder orifice 11. Knife 59 may be actuated by a suitable fluid operated reciprocating cylinder motor (not shown) to effect the desired severing movement. Preferably, the severing accomplished by the knife 59 is done in a rapid fashion so as to leave the oncoming end of the next length of tubing 12 open.

Concurrently with the severing action of knife 59, or immediately thereafter, the mold bed 13 and closed partible mold sections 29 and 30 are moved downwardly relative to the orifice 11 and at a speed greater than the extrusion rate of the oncoming tubing so as to space apart the severed ends of the tubing and permit the extruder 10 to operate continuously (FIG. 3). By so doing, the extruder will issue a successive length of tubing 12 while the molding apparatus is performing the hereinafter described blowing and trimming operations for forming the bottle.

Relating to closing the mold sections 29 and 30 as shown on FIG. 2, the motors 33 and 34 are connected to pressurized fluid through ports 60 and 61 and fluid is exhausted from motors 33 and 34 through ports 62 and 63.

Mold bed 13 is moved down to the "blowing position" by motors 16 and 17 which receive pressurized fluid through their ports 51 and 52 and exhaust fluid through their ports 49 and 50. The mentioned blowing position of mold bed 13 is shown in FIG. 3.

A blow head 64 is provided in axially aligned relationship with aperture 28. The blow head 64 has tapered side walls and is correspondingly similar in configuration to the closed aperture 28 when the holding members 18 and 19 are closed. As seen on FIG. 4, the blow head 64 is of a slightly lesser diameter than the tapered side walls of the aperture 28 so that when the blow head is inserted within the aperture, it will receive the axial end portion 12a of the tubing and press it out against the tapered side walls of the aperture. At the top corner of the aperture side wall is provided a thin annular lip 65 which is knife sharp. This lip 65 defines the smallest diameter of the closed aperture 28. The blow head 64 has a cylindrical shank portion 64a which is received within a housing 65 and is axially slidable therein. The blow head 64 is reciprocated vertically in and out of its housing 65 by having a connection with the fluid actuated motor 66. It is preferred that the motor 66 be connected to receive pressurized fluid through its port 67 to extend the blow head 64 to its uppermost position prior to or at the time of inserting it into the internal bore of the end portion of the tubing 12a. The blowing tool or head is thus inserted by lowering the mold bed 13 to its lowermost or blowing position. When the end portion 12a of the tube is brought down over the blow head 64, an annular score is pressed in the tubing along the plane of the top surface of the holding members 18 and 19 (see FIG. 4), and, simultaneously with this pressing action, the blow head achieves a seal with the internal bore of the severed length of the plastic tubing 12. Thereafter, a blowing fluid is supplied under pressure through an axial passage 69 in blow head 64 which expands the length of tubing in the closed mold to the configuration of the mold cavity A. This blowing fluid is connected at line 70 which communicates with the axial passage 69 within the blow head housing 71. When the blowing head 64 is extended a valve (not shown) may be used to turn the blowing fluid "on" and "off" to achieve the desired duration and timing for applying blowing fluid to the head 64 when the latter is extended. During this blowing operation, the same fluid pressure will further force the tubing at the axial end of the neck by further forcing the tubing outwardly against the annular lip 65 in the aperture 28 and, hence, the score line is further accentuated. The fluid pressure for blowing is maintained by the blow head 64 for a sufficient length of time to insure the expansion and setting of the plastic of the tubing to conform to the molding cavity A. Near the end of the blowing period and including time for allowing the plastic to cool and set to the self-supporting shape within the mold cavity, the axial end portion 12a is severed from the formed article by a lateral cutting action supplied in the plane of the bottom face of the partible mold sections 29 and 30. As seen on FIG. 4, the annular lip 65 of the aperture 28 comprises a knife-sharp edge and the severing in the preferred form of the invention is accomplished shifting the closed mold sections 29 and 30 laterally along the mold bed groove 57 (FIGS. 2, 3 and 5). This motion may be accomplished by actuating the piston motor 34 whereby pressurized fluid is introduced through port 61 and fluid is exhausted at port 63. The motor 33 is set in a position, through suitable valve controls (not shown), so that both the port 62 is blocked from receiving pressurized fluid and port 60 is simultaneously connected to exhaust. This exhaust from port 60 may be provided with an adjustable throttling or metering valve (not shown) of any suitable type to control the rate of this exhaust as desired, and thus, control the rate of lateral shifting movement of the closed mold sections. Thus, the speed of severing is controllable. It is preferred that this lateral cut be made rapidly to effect as clean a cut as possible. In this severing motion, the closed mold sections 29 and 30 are bodily shifted laterally, for example, to the right starting from the position of the mold sections shown in FIG. 3 to their positions as shown in FIG. 5. During this time, the fluid pressure applied through axial passage 69 for blowing is kept "on" in order to maintain a positive pressure within the blown article B in the mold so as to hold it firmly against the walls of the mold cavity A. After the mold sections 29 and 30 are shifted across and to one side of the aperture 28, the tube holding members 18 and 19 are actuated to open position. In the severing step, above described, the axial end portion 12a of the tubing (representing the excess plastic trimmed from the formed bottle) will be retained on the blow head 64. This plastic may be removed from the blow head by one of three methods.

If the lower end of the excess plastic portion 12a extends outwardly beyond the lower shoulder of the taper of the blow head 64 (FIG. 4), it may be successfully removed merely by a "stripping" action. This is accomplished after the holding members 18 and 19 are opened by withdrawing the blow head 64 within its housing 71 through the actuation provided by the motor 66. Obviously, as the blow head 64 is withdrawn, the lower edge of the plastic 12a will engage the upper sides of housing 71 and since the blow head is withdrawn therein, the portion 12a is stripped from the blow head.

The preferred method for removing the excess plastic is shown in FIG. 6, wherein air or other fluid under pressure is supplied to a line 73 which communicates with passages 75 and 76. Passages 75 and 76 are axially disposed in the blow head and are arranged to exit or open along the tapered sides of the blow head member. The fluid pressure is thus applied after the holding members 18 and 19 are opened and the trimmed portion of plastic 12a will be ejected, such as illustrated on FIGS. 5 and 6. This will free the blow head 64 ready for the next cycle. The timing for the ejection by introducing air at passages 75 and 76 may be varied. Obviously, it would be preferable to delay such ejection at least until after opening the holding members 18 and 19 for returning them to their loading position. If this is delayed until the mold bed 13 is returned to the loading position (FIG. 1) and the pressurized air applied through passages 75 and 76, the trimmed plastic 12a resulting from the bottle cycle just completed may be blown clear of the blow head and without interference from the mold bed. Thus, the illustration shown on FIG. 5 represents the earliest time for ejection of the plastic 12a.

The third method which may be employed for removal of this excess portion of plastic 12a comprises merely applying a vacuum through passages 75 and 76, but prior to opening the holding members 18 and 19. This will retain portion 12a on blow head 64 and permit withdrawing it from the closed aperture 28, since the closed aperture 28 is tapered in favor of such withdrawal in that direction. The blow head 64 withdraws from the aperture under actuation of motor 66 and if portion 12a overlaps the margins of the taper on head 64 it will be stripped from the head by engagement with housing 71. The stripping action may be aided by either neutralizing the vacuum in passages 75 and 76 or reversing the vacuum to introduce a positive pressurized fluid. This latter-mentioned expedient would assure removal of portion 12a should it not overlap the marginal edge of the tapered head 64 so as to make stripping possible.

The practice of applying air through passages 75 and 76 will also serve to cool the blow head 64, before beginning the next bottle blowing cycle. This will assist in eliminating sticking of the blowing member in the interior of the next tube. By use of the air pressure solely, it may not be necessary to reciprocate the blow head 64 vertically, however, if it is withdrawn into the housing 71 and air is applied through passages 75 and 76, ejection of portion 12a will in all cases be assured.

After the trimming operation has been completed by shifting the molds across the knife edge of the annular lip 65 in the aperture 28, the molds 29 and 30 are opened by withdrawing mold section 30 to its open position (compare FIGS. 5 and 1), but before the mold bed is returned to loading position (FIG. 1). Upon opening the mold sections 29 and 30, the molded and trimmed article is freed and may be ejected by any suitable means such as a laterally directed jet of air.

After the formed bottle is ejected, the mold bed and its tube holding members 18 and 19 and partible mold sections 29 and 30 are immediately returned to their loading positions, as shown on FIG. 1, for the next cycle. Since the extruder 10 has been continuously producing a new length of plastic tubing 12, the machine is immediately ready to begin the next cycle to produce, in succession, the next plastic article.

Various modifications may be resorted to within the spirit and scope of the appended claims.

I claim:

1. In a blow molding apparatus wherein a freely vertically dependent length of tubing in a condition of plasticity suitable for expansion and setting is issued downwardly from an extrusion orifice between the open sections of a partible blow mold positioned adjacent the orifice, the improvements of a pair of tube guide elements normally spaced transversely through a distance greater than the diameter of the tube, means supporting said elements independently of the mold and with the mold interposed between the elements and the orifice so that said elements freely receive therebetween a portion of the tube depending beyond the confines of the mold, means for actuating said elements radially of the tube into contact with the tube beyond the confines of the mold, the elements cooperating with the material confined by the orifice to retain the tube in vertical axial alignment with the orifice prior to closure of the mold onto the tube, the lower free end of the tube projecting beyond said elements for freely receiving therein said blow head.

2. In a method of blow molding a plastic article from a freely vertically dependent length of tubing in a condition of plasticity suitable for expansion and setting, a length of the tubing being issued downwardly from an extrusion orifice between the open sections of a partible blow mold positioned directly beneath the orifice, the steps of continuing the extrusion until the lower end of the tube projects well beyond the vertical extremities of the mold, closing onto that portion of the tube projecting beyond the mold a pair of transversely movable positioning elements aligned vertically with the orifice, the elements cooperating with the orifice to fixedly position the extruded tube in a true vertical position, closing the blow mold sections on the tube intermediate the orifice and the holding members, and inserting a blow nozzle into that portion of the tube projecting beyond the holding members.

3. In an apparatus for aligning extruded tubing for use in blowing hollow plastic articles therefrom and trimming such blown plastic articles, the combination of a mold supporting member, a pair of complementary tube holding members supported by said supporting member, said holding members defining a variable width aperture and operable for opening and closing movement, said aperture being adapted to receive a hollow tubular formation therein when open and axially align and position said formation when closed, power means operatively connected to said holding members for moving them between open and closed positions, a pair of partible blowing mold sections defining a molding cavity having the shape of a formed plastic article and including an opening, means for closing said blowing mold sections independently of said holding members and registering the mold opening, when the molds are closed, with said aperture when said holding members are closed, a tube blowing means insertable within said aperture and capable of effecting a sealed engagement with the internal bore of the hollow tubular formation held in the closed aperture, means for relatively moving said tube blowing means axially with respect to said aperture and inserting it into said internal bore for blowing a shape of article in said blowing mold, means on said holding members for trimming plastic material from the shaped article externally of the molding cavity at the mold opening thereof, and means operatively associated with said tube blowing means for removing the trimmed plastic.

4. In an apparatus for aligning extruded tubing issuing from a source for use in blowing hollow plastic articles therefrom and trimming such blown plastic articles, the combination of a means movable toward and away from said issuing source and defining an aperture axially aligned with said issuing source, said aperture being adapted to receive a hollow tubular formation therein and axially align and position said formation, a pair of partible blowing mold sections defining a molding cavity having the shape of a formed plastic article and including an opening, means for closing said blowing mold sections and registering the mold opening, when the molds are closed, with said aperture, a tapered blow head insertable within said aperture in sealing engagement with the internal bore of the hollow tubular formation held in the aperture, means for relatively moving said blow head axially with respect to said aperture to insert it into said internal bore for blowing the formation to a shape of article in the mold, means for trimming plastic material from the shaped article externally of the molding cavity at the mold opening thereof, fluid conduits in said blow head opening in that portion of the tapered blow head surface covered by the trimmed plastic material, and means for applying a differential in pressure at the surface of said trimmed plastic material through said fluid conduits for removing said trimmed plastic material, whereby the blow head is cleared for subsequent cooperation with the aperture.

References Cited in the file of this patent

UNITED STATES PATENTS

| 1,848,940 | Delpech | Mar. 8, 1932 |
| 2,787,023 | Hagen et al. | Apr. 2, 1957 |
| 2,810,934 | Bailey | Oct. 29, 1957 |
| 2,899,709 | Steiner | Aug. 18, 1959 |
| 2,903,740 | Parfrey | Sept. 15, 1959 |

FOREIGN PATENTS

| 744,927 | Great Britain | Feb. 15, 1956 |
| 688,997 | Great Britain | Mar. 18, 1953 |
| 203,385 | Australia | Sept. 27, 1956 |
| 163,661 | Australia | Dec. 18, 1952 |
| 83,390 | Netherlands | Nov. 15, 1956 |
| 1,029,586 | France | Mar. 11, 1953 |
| 1,104,304 | France | June 8, 1955 |
| 1,105,529 | France | July 6, 1955 |